R. DOTY.
COMBINED SPRING SHACKLES AND STEPS.
No. 194,863. Patented Sept. 4, 1877.
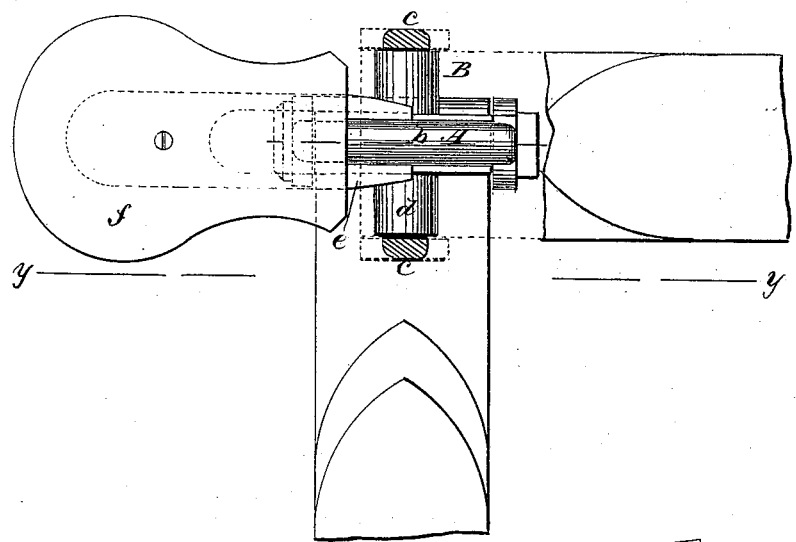
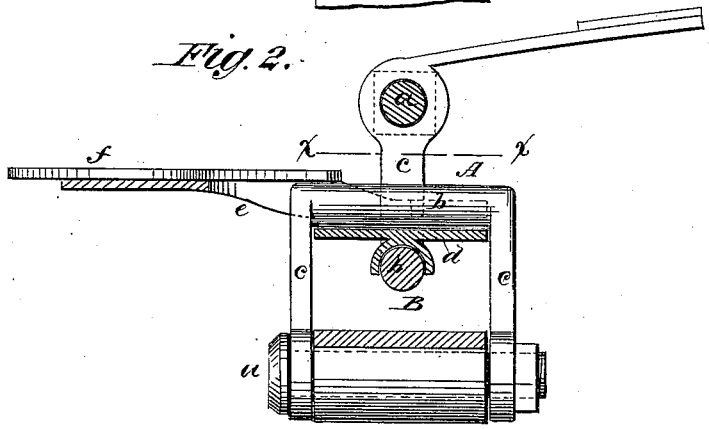
WITNESSES:
Francis McArdle.
J. H. Scarborough.
INVENTOR:
R. Doty.
BY
ATTORNEYS.

UNITED STATES PATENT OFFICE.

REUBEN DOTY, OF WELLSVILLE, NEW YORK.

IMPROVEMENT IN COMBINED SPRING-SHACKLE AND STEP.

Specification forming part of Letters Patent No. 194,863, dated September 4, 1877; application filed May 12, 1877.

*To all whom it may concern:*

Be it known that I, REUBEN DOTY, of Wellsville, county of Allegany and State of New York, have invented a new and useful Improvement in Combined Shackle and Step, of which the following is a specification:

Figure 1 is a plan view of my improved shackle and step in section on line $x\ x$ in Fig. 2. Fig. 2 is a transverse section on line $y\ y$, Fig. 1.

Similar letters of reference indicate corresponding parts.

My invention consists in the peculiar construction of a shackle for coupling the springs of platform-wagons, and in the combination of a step with the shackle, as hereinafter more fully described.

In the drawing, A and B are portions of the shackle that are secured to the ends of the wagon-springs by bolts $a$. The parts A B are similar, and consist of a round bar, $b$, from the ends of which the arms $c$ project at right angles and parallel to each other. At the ends of these arms eyes are formed for receiving the bolts $a$.

The bars $b$ of the parts A B are arranged at right angles to each other, and between them a bearing-piece, $d$, is placed, which consists of two semicircular parts, arranged at right angles, having their convex surfaces attached together centrally. This bearing-piece covers half of the surface of each of the bars $b$. From upper part of the bearing-piece an arm, $e$, projects, to which a step, $f$, is secured by means of a rivet or screw.

The step may be attached directly to the part A, if desired, when the arm $e$ may be dispensed with.

The advantages claimed for my improvement are that the shackle is cheaply and easily constructed and applied. Friction is distributed over a large surface, so that the wear is reduced to a minimum, and the step is always kept in a horizontal position.

Having thus fully described my invention, I claim as new and desire to secure by Letters Patent—

The shackle A B, that connects wagon-springs, provided with the piece $d$ to serve as a bearing for parts A B, and a support for the step, as shown and described.

REUBEN DOTY.

Witnesses:
JOHN J. S. LEE,
A. A. WHITE.